United States Patent [19]

Schotter

[11] Patent Number: 5,125,980
[45] Date of Patent: Jun. 30, 1992

[54] OPTICAL FIBER CLEANER

[75] Inventor: Daniel K. Schotter, Tucson, Ariz.

[73] Assignee: Hughes Aircraft Company, Los Angeles, Calif.

[21] Appl. No.: 695,849

[22] Filed: May 6, 1991

Related U.S. Application Data

[62] Division of Ser. No. 404,809, Sep. 8, 1989, Pat. No. 5,056,185.

[51] Int. Cl.$^5$ ............... B08B 1/00; B08B 1/02; B08B 3/02
[52] U.S. Cl. ............... 134/15; 134/32; 15/302; 15/308; 15/309.1
[58] Field of Search ............... 134/15, 32; 15/302, 15/308, 309.1

[56] References Cited

U.S. PATENT DOCUMENTS 3,530,526  9/1970  Schmidt ............... 15/302
4,391,016  7/1983  Kawamura et al. ............... 15/302

Primary Examiner—Theodore Morris
Assistant Examiner—Zeinab El-Arini
Attorney, Agent, or Firm—C. D. Brown; R. M. Heald; W. K. Denson-Low

[57] ABSTRACT

An optical fiber (12) being removed from a storage spool (14) for winding onto a canister (20) passes through a housing formed from separable parts (22, 24). A chamber (34) within the housing has a nozzle (40) connected to a supply of a cleaning solvent and directs a spray of the solvent onto the moving fiber. Another version locates a further nozzle (46) within the housing directing a pressurized air stream on the fiber to dry the solvent as well as remove foreign particulate matter from the fiber. Yet another version has brushes (50, 52) within the housing that the fiber moves against to aid in removing particulate matter from the fiber surface.

4 Claims, 2 Drawing Sheets

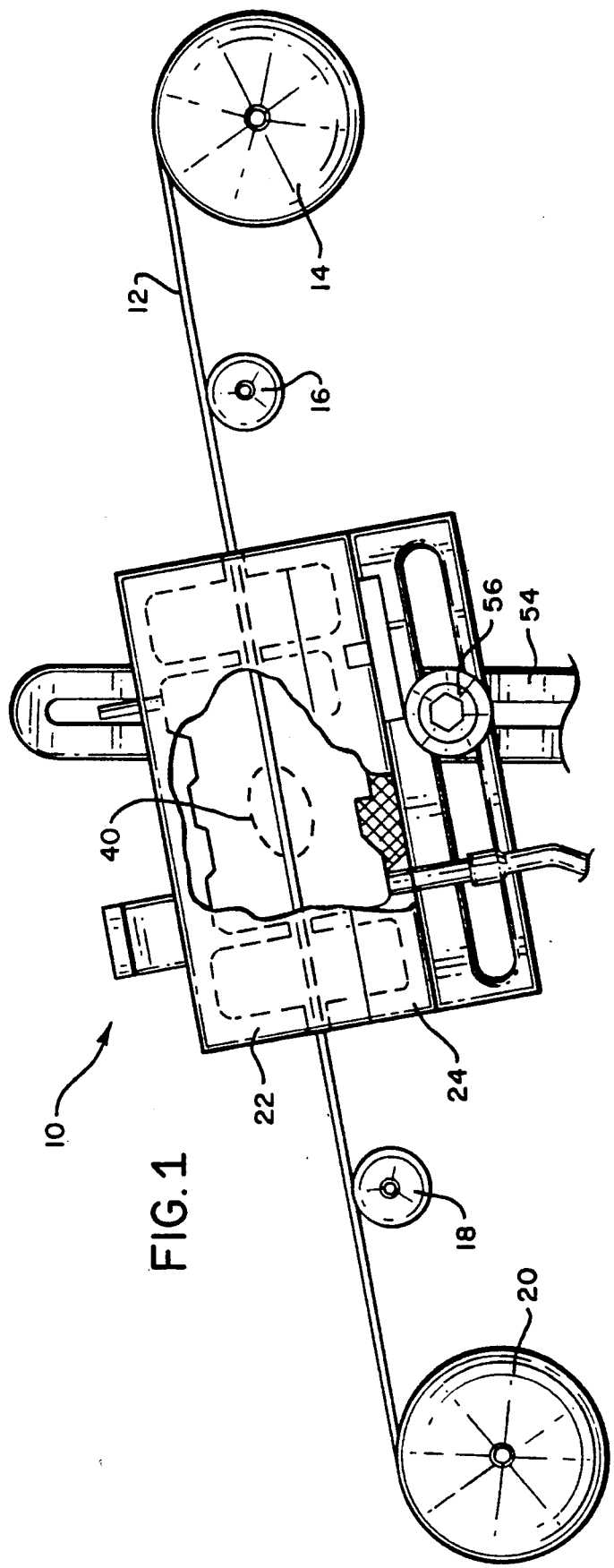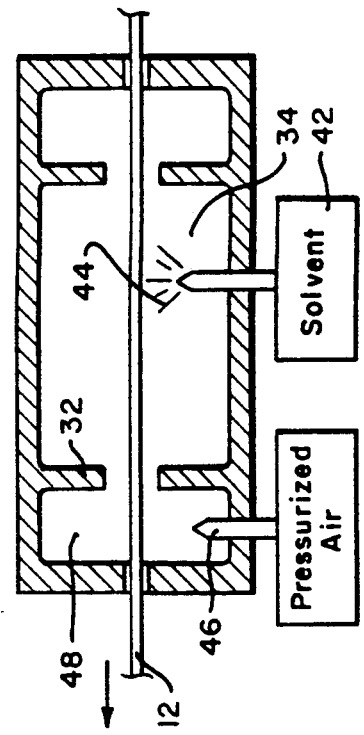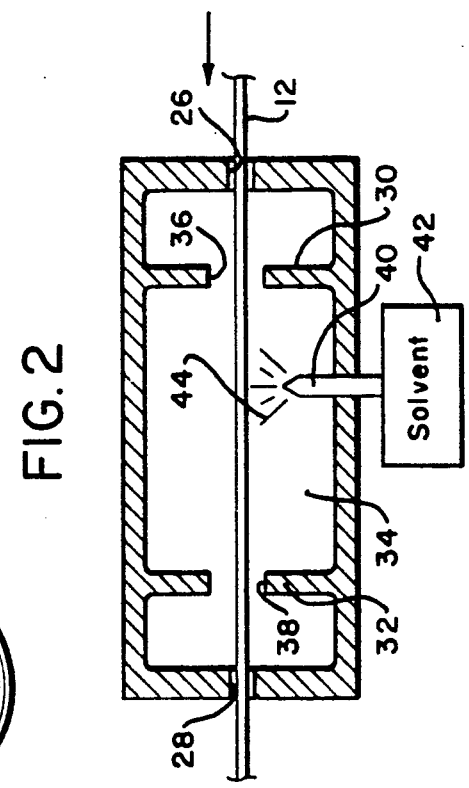

OPTICAL FIBER CLEANER

This is a division of application Ser. No. 07/404,809. filed Sep. 8, 1989, now U.S. Pat. No. 5,056,185.

BACKGROUND OF THE INVENTION

1. Field of the Invention

The present invention relates generally to apparatus for cleaning an optical fiber, and, more particularly, to such cleaning apparatus for in-line use during the winding of the fiber onto a canister or bobbin to form a missile data link and which operates in a manner so as not to subject the fiber to undue stress or bending.

2. Description of Related Art

A standard technique at the present time for cleaning a fiber either prior to inspection or prior to winding onto a bobbin is to pass it into contact with a dry sponge pad or the like for removing particulate materials from the fiber, for example. This technique is subject to the disadvantage of risking the entrapment of these particulates within the pad themselves which subsequently abrade the fiber as it moves against the sponge pad damaging the buffer coating.

Another known method of cleaning the fiber consists of moving it along a path through a tank of solvent which can either be at rest or moving in a counterdirection, for example. The fiber is moved along this path by a set of pulleys having peripheral grooves within which the fiber is frictionally engaged. This system has the disadvantage of risk of damaging the fiber by the contact pressure of the pulleys which can force particulate matter residing on the fiber surface deeper into the fiber coating. In this case, such a fiber upon being subsequently wound onto a canister or bobbin results in increased stress at the point of the imbedded particulate matter which can produce either or both increased loss of optical signal as well as a reduction in the structural integrity of the fiber.

It is, therefore, desirable to provide apparatus and method for cleaning an optical fiber which can operate in line with the winding of the fiber onto a canister or bobbin and which does not subject the fiber during cleaning to undue stress, bending or kinking. In addition, the cleaning apparatus should remove surface particulate material without risking the embedding of the particulate material within the fiber buffer coating.

SUMMARY OF THE INVENTION

In accordance with a first version of the invention, the fiber which is drawn from a storage spool and being wound onto a missile canister or bobbin, for example, is intercepted by a closed housing having entrance and exit openings through which the fiber passes. A central chamber within the housing includes a spray nozzle at one side which directs an airborne solvent toward and into contact with the fiber moving therepast. The solvent spray impinging upon the fiber removes particulates that may be present so that as the fiber moves outwardly of the housing it has a clean surface, and can be safely wound upon the canister or bobbin.

Depending upon the solvent used and the spacing of the cleaning apparatus from the winding onto the bobbin or canister, it may be necessary to provide a drying means, such as a separate chamber within the cleaning housing following that where the solvent is sprayed onto the fiber, where there is provided in one of the side walls with an air nozzle for both drying the solvent and physically removing any additional loose particulate materials that may still be present on the fiber surface.

In accordance with a further embodiment, a pair of brushes are rotatably mounted on parallel axes at opposite sides of a straight line between the entrance and exit housing openings. The fiber is caused to pass between the two brushes and contacts each brush very lightly. The brushes have relatively soft bristles which produces a very slight frictional engagement with the fiber surface that cooperates with the cleaning spray to produce an efficient fiber surface cleaning without damaging the fiber by excessive bending, for example. The spray, in addition to producing the cleaning action on the fiber, also serves to remove particulate material clinging to the brushes which, if allowed to remain on the brush, could end up damaging the fiber much in the same way as the prior art pads.

BRIEF DESCRIPTION OF THE DRAWINGS

In the accompanying drawings:

FIG. 1 is a side elevational view showing the cleaning apparatus of this invention incorporated into an in-line operation winding a filament onto a bobbin or canister;

FIG. 2 is a top plan sectional view taken along the line 2—2 of FIG. 1 depicting a first form of the present invention; and FIG. 3 is a top plan sectional view similar to FIG. 2 only showing an alternate embodiment of the invention.

DESCRIPTION OF PREFERRED EMBODIMENTS

Figure 4:
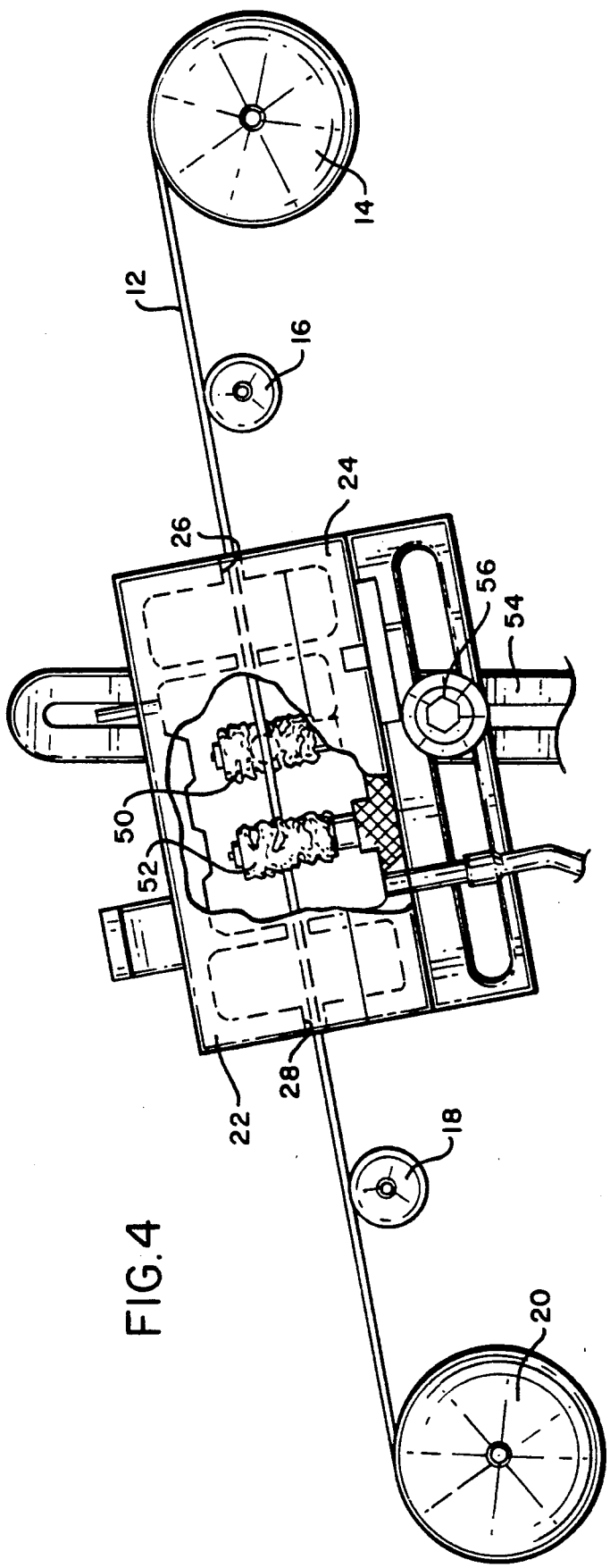
FIGS. 4-6 are views corresponding to FIGS. 1-3, respectively, showing similar embodiments incorporating rotary brushes.

Turning now to the drawings and particularly FIG. 1 the apparatus of the present invention for cleaning a fiber is identified generally as 10 and is seen to intercept a fiber 12 which is taken off a storage spool 14 by a pair of pulleys 16 and 18 for winding onto a canister or bobbin 20 to form a data link for a missile, for example.

The optical fiber 12 upon being stored onto a spool and while it is being wound onto another canister or bobbin as shown in FIG. 1 frequently has foreign particulate matter clinging to its outer surface which, if not removed, can become embedded in the fiber buffer coating resulting in deteriorated performance of the fiber which is undesirable. It is accordingly a primary purpose of the apparatus 10 to remove the particulate matter that is adhering to the outer surface of the fiber prior to its being rewound onto a bobbin or canister.

With additional reference to FIG. 2, the housing for the apparatus 10 includes an upper part 22 and a lower part 24 which can be releasably joined together. More particularly, the two housing parts 22 and 24 have opposite end walls defining an entrance opening 26 and an exit opening 28 within which the fiber 12 is received and releasably captured on joining of the two housing parts. It is contemplated that additional apparatus will not be needed for drawing the fiber through the housing during cleaning, but rather the pulley 16 and 18 will already be available for taking the fiber off the storage spool 14 and winding it onto the canister or bobbin 20.

The housing parts further include internal partitions 30 and 32 which define a central cleaning chamber 34 within the housing through which the fiber passes via respective entrance and exit openings 36 and 38.

At one side of the chamber 34 there is provided a spray nozzle 40 interconnected with an externally located source of a supply 42 of cleaning solvent which is selectively actuatable to direct a pressurized liquid spray 44 directly against the side of the fiber as it moves through the apparatus housing. The solvent spray, both as a result of the chemical cleaning action and the force of the pressurized spray against the fiber, produces a chemical cleaning of the fiber outer surface and physical removal of any foreign particulate matter. The use of a spray is preferable to soaking in a tank of solvent which has been found to loosen and damage the fiber buffer coating.

If the fiber has to move a substantial distance between the cleaning apparatus 10 and the winding apparatus and the cleaning solvent used is of a highly volatile nature, then the fiber surface will be quickly dryed merely by passing through the normal ambient air. However, in certain cases it may be advisable to insure that the surface is dry before it is wound onto the canister. It is accomplished here by adding a pressurized air nozzle 46 (FIG. 3) within the further chamber 48 defined by the housing end wall and the partition 32 which will direct a stream of pressurized air against the fiber as it moves from the cleaning chamber 34. Not only will the solvent be dried, but also any further particulate materials which may be adhering to the outer surface of the fiber is also dislodged and removed.

It is typical practice after cleaning the fiber to apply an adhesive prior to the winding onto the canister or bobbin in order to maintain dimensional and geometric integrity of the wound canister 20. This is not shown.

Figure 6:
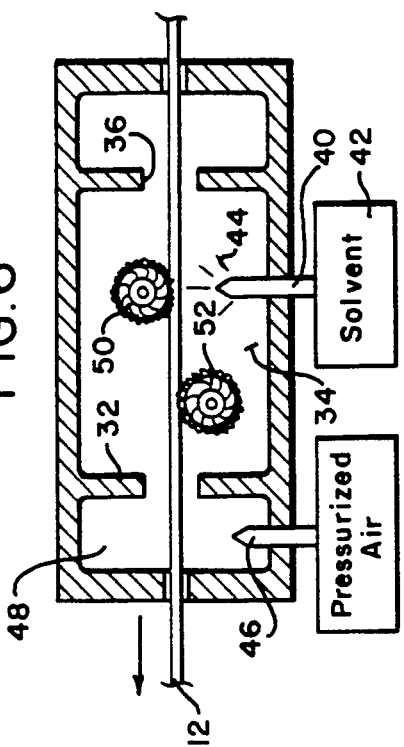
Figure 5:
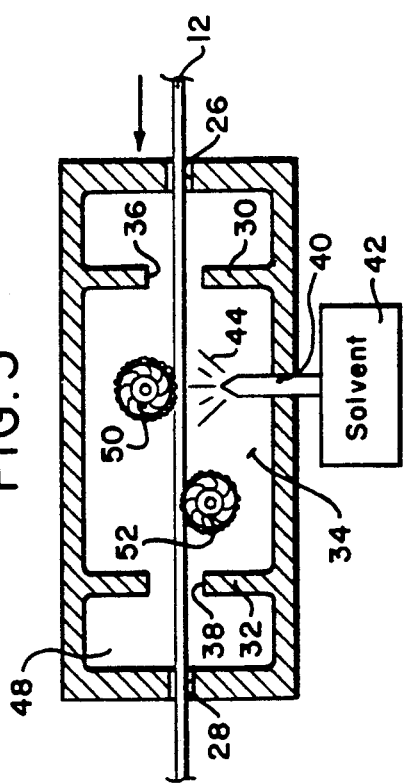

FIGS. 4-6 are now relied upon for the ensuing description of still further embodiments of the invention. The housing parts 22 and 24 can be identical to that described in connection with the first two versions of this invention including the internal chambers and partitions 30 and 32 defining the cleaning chamber 34 and chamber 48. The primary difference from the earlier described version is that first and second generally cylindrical brushes 50 and 52 are mounted, respectively, on opposite sides of the straight line path between the housing entrance and exit openings 26 and 28 with their rotative axes being parallel to one another. The brushes are also spaced apart along the fiber path of movement.

In use, the incoming fiber 12 passes to the inside of the brush 50 and then finally to the inside of the brush 52 before exiting through openings 38 and 28. In this way, as the fiber moves through the housing there is a slight frictional engagement with the brushes producing low pressure contact with the bristles of the brush to enhance cleaning of the fiber. The brush contact pressure is so slight as to produce substantially no fiber bending from the straight line movement path.

In this embodiment, not only does the pressurized cleaning solvent directly clean the fiber, but also the particulate matter is removed from the brushes by this same pressurized solvent thereby avoiding the possibility of pressure contact between the particulate matter trapped in the bristles and the fiber which could produce damage to the fiber as already noted.

Specifically, FIG. 5 shows a version where only solvent is sprayed onto the fiber as it moves through and past the brushes 50, 52. In FIG. 6, on the other hand, both solvent spraying and forced air drying is combined with the action of the brushes to clean the fiber surface.

In all embodiments, the housing parts 22 and 24 are suitably mounted (e.g., bracket 54) to receive the fiber being wound onto the bobbin 20. Adjustment can be made by loosening and retightening lock nut 56, as needed.

In accordance with the practice of this invention there is provided a cleaning apparatus which quickly and efficiently removes surface particles from the fiber without disturbing the buffer or damaging the fiber in any way, such as by stressing or kinking as is produced in certain prior techniques. The speed with which the cleaning is accomplished enables it to be directly incorporated into an in-line winding operation for the final canister or bobbin. Moreover, a quick spraying of the fiber is preferable to immersing in a solvent tank since soaking in many of the solvents which have been used in the past (e.g., MEK or 1, 1, 1-Trichlor) has been found to loosen the fiber buffer which is highly undesirable and produces a fiber of reduced optical signal transmission.

Although the present invention has been described in connection with a preferred embodiment, it is to be understood that those skilled in the art will recognize other embodiments, changes, variations and configuration that can be utilized and still remain within the spirit of the invention.

What is claimed is:

1. A method of cleaning an optical fiber as it is being wound from a storage spool onto a canister comprising the steps of:
    moving the fiber along a substantially straight path through a housing;
    directing a solvent spray transversely across the fiber while it is within the housing;
    contacting one side of the fiber within the housing with a first brush at substantially the same place where the solvent spray is directed without significantly moving the fiber from the straight line path of movement; and
    contacting another side of the fiber within the housing with a second brush at point spaced from the first brush along the direction of fiber movement, the contacting force being insufficient to significantly move the fiber from the straight path of movement.

2. A method as in claim 1, in which the housing is located at such a distance from the canister and the speed of fiber movement is sufficiently slow so that the solvent on the fiber will dry before the fiber is wound onto the canister.

3. A method as in claim 1, in which the solvent spraying takes place in a first housing chamber, and the fiber after being sprayed with solvent and contacted by the brushes moves through a second housing chamber where a pressurized air stream is directed across the fiber to dry it.

4. A method of cleaning the surface of an optical fiber while it is being taken off a storage spool and wound onto a canister, comprising the steps of:
    moving the fiber along a relatively straight-line unrestrained path through a housing without inducing an amount of physical stress sufficient to damage optical signal transmission properties of the fiber;
    forming a solvent spray at one side of the fiber within a first chamber in the housing;
    directing the solvent spray toward the one side of the fiber;
    contacting the other side of the fiber at a point directly opposite the solvent spray with a first brush, the contact force being insufficient to move the fiber significantly from its straight-line path or induce detrimental stress in the fiber;

contacting the one side of the fiber with a second brush at a point spaced from said first brush along the direction of fiber movement, the contacting force being insufficient either to significantly move the fiber out of its path of movement to induce damaging fiber stress; and directing a stream of pressurized air across the fiber in a second chamber spaced from said second brush farther along the direction of fiber movement immediately prior to moving the cleaned and dried fiber outwardly of the housing.

* * * * *